United States Patent Office 3,119,453
Patented Jan. 28, 1964

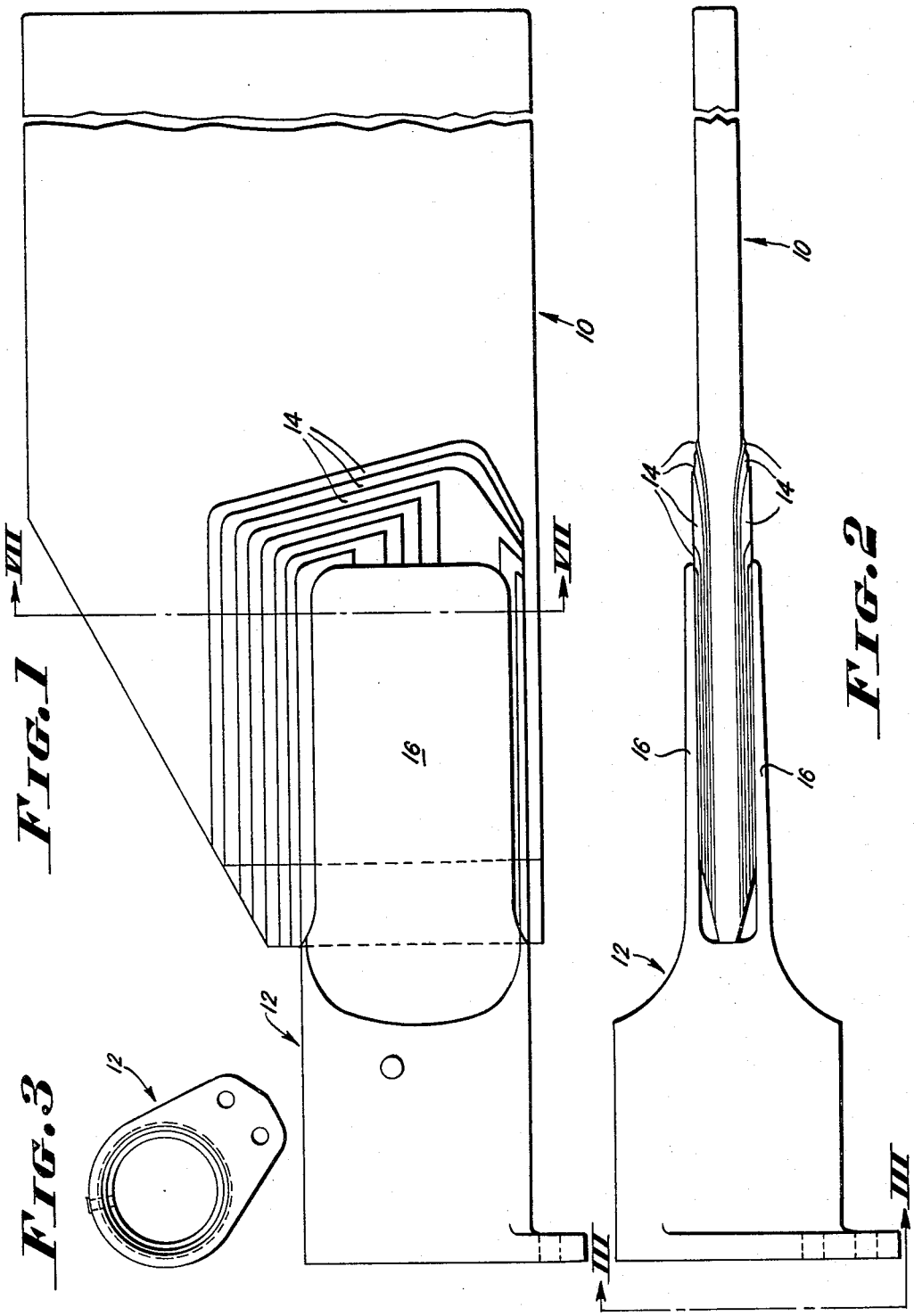

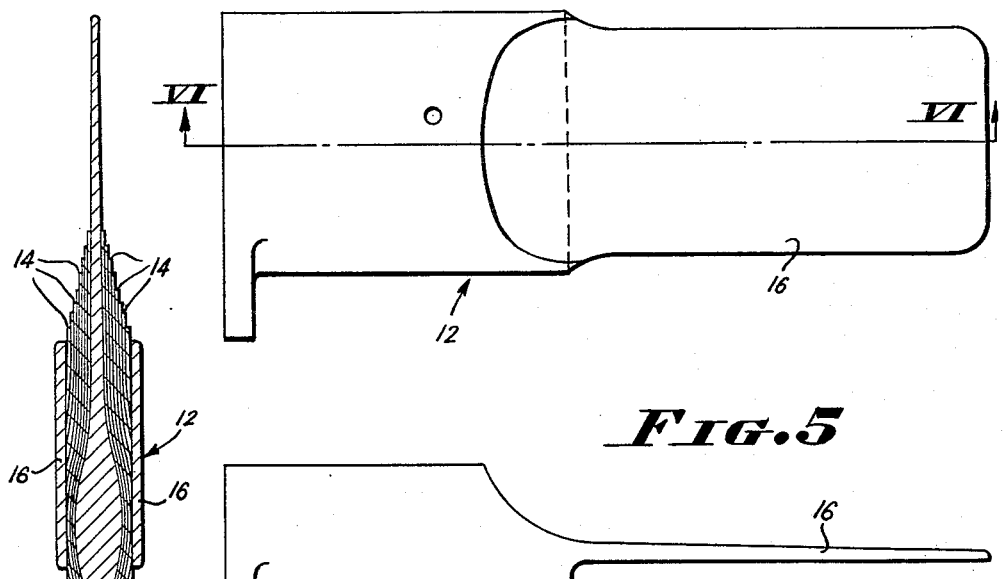
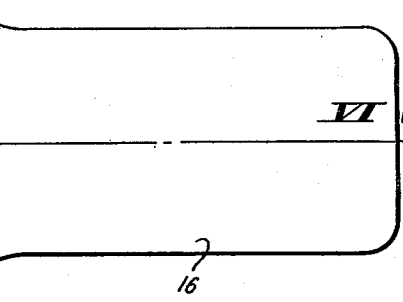
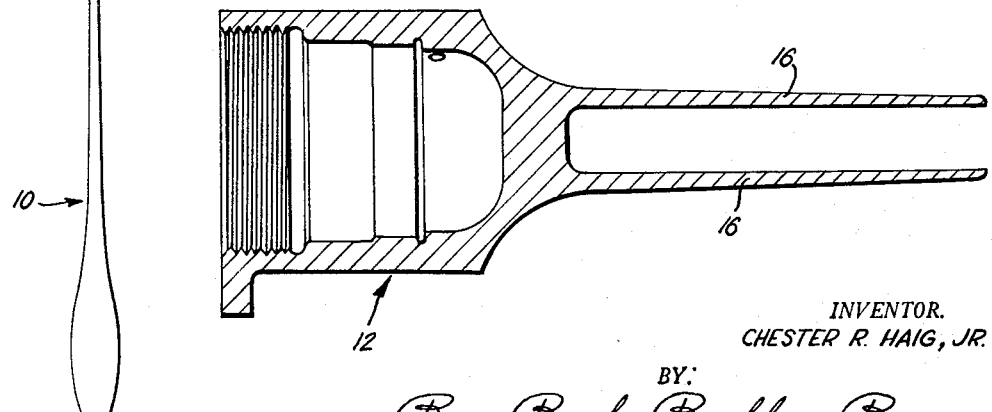

3,119,453
HELICOPTER ROTOR BLADE
Chester R. Haig, Jr., Irving, Tex., assignor to Bell Aerospace Corporation, a corporation of Delaware
Filed Dec. 2, 1960, Ser. No. 73,337
5 Claims. (Cl. 170—159)

This invention relates to helicopter rotor constructions, and more specifically to an improved rotor blade construction for use in helicopter tail rotor and/or lift rotor systems.

One of the objects of the present invention is to provide an improved rotor blade construction as aforesaid which features the use of solid metal extrusions, forgings, stampings or the like for the blade components of the system; said members being of novel sectional form whereby proper chordwise mass balance is obtained in combination with good aerodynamic properties.

Another object of the invention is to provide a rotor blade as aforesaid which is of such sectional design as to be adapted to be manufactured with utmost facility by relatively economical metal shaping processes; whereby substantial manufacturing economies are obtainable compared to the cost of making presently conventional type blade fabrications which are commercially avaliable for similar purposes.

More specifically, another object of the invention is to provide a solid metal blade which is of such sectional form as to obtain at the same time an approximately 25% chordwise center of gravity location, in combination with good aerodynamic characteristics when moving at the speeds at which helicopter rotors typically operate.

Another object of the invention is to provide an improved helicopter rotor blade as aforesaid which is relatively inexpensive to manufacture, and which will be more rugged and less subject to service damage than are other type blades such as are conventionally employed.

Still another object of this invention is to provide an improved helicopter rotor blade as aforesaid which may be easily manufactured to conform to the prescribed shape and dimensional patterns thereof throughout the entire span-wise extent of the blade, and which may be readily provided with surfaces of improved smoothness and which are otherwise more suitable for the reception of finish coatings or other treatments.

Still another object is to provide an improved blade as aforesaid which is invulnerable to climatic and humidity environments, and which is of improved fatigue strength characteristics and otherwise less susceptible to service failures.

Other objects and advantages of the invention will appear from the specification hereinafter and by reference to the drawings herewith wherein:

FIG. 1 is a fragmentary top plan view of a rotor blade construction of the present invention and its associated hub grip;

FIG. 2 is a leading edge elevational view of the blade and grip construction of FIG. 1;

FIG. 3 is an end view, on reduced scale, of the blade construction taken along line III—III of FIG. 2;

FIG. 4 is a top plan view of the blade grip device;

FIG. 5 is a front elevational view of the device of FIG. 4;

FIG. 6 is a sectional view taken along line VI—VI of FIG. 4;

FIG. 7 is a sectional view taken along line VII—VII of FIG. 1; and

FIG. 8 is a profile illustration of a typical airfoil sectional form of the blade element of the present invention.

As illustrated herewith, the blade construction of the present invention comprises essentially a solid metal blade element as designated generally at 10; a blade grip device as indicated generally at 12; and a plurality of suitable filler plates or "doublers" as indicated at 14 which function to fit the root of the blade 10 to the shape of the clevis portions 16—16 of the grip device. As illustrated in FIGS. 7, 8, the blade 10 is of the so-called "symmetrical" sectional form, and is distinctively of "tadpole" sectional shape comprising an ellipsoidal form at the ⅓ front portion of the chord section subtended by a relatively thin aft body and trailing edge portion which is faired into the leading edge portion and tapers into a relatively sharp trailing edge section.

The profile form and solid section nature of the blade disposes the center of gravity of the sectional area at about the ¼th chordline. This result is easily obtained for example by forming the front section of the blade to an ellipsoid shape having an approximately three-to-one ratio of width to thickness; and then fairing into the ellipsoidal section a relatively thin and rearwardly tapering trailing edge portion, as shown clearly for example in FIG. 8 of the drawing herewith. Such sectional form is particularly suited to manufacture by the presently standard solid metal extrusion process, whereby a solid metal blade as described may be easily manufactured at substantial cost savings compared to the cost of manufacturing presently conventional built-up hollow metal rotor blades, or the like. Also, such blades of the present invention have been found to provide satisfactory aerodynamic characteristics without any modification of the basic sectional form. However, it will of course be understood that the basic form illustrated herein may be somewhat modified as desired, while still retaining the advantages of the invention; such as by varying the ordinants of the blade sections from leading to trailing edge, or by deviating from the strictly symmetrical blade form such as by introducing a camber or taper, if preferred. In any case, the invention contemplates the use of a single, solid metal blade section which is easily and inexpensively manufactured such as by a simple metal extrusion, forging or stamping process or the like, of a suitably selected aluminum alloy or the like; and which is thereby inherently rugged and vibration-proof, as well as being of suitable aerodynamic characteristics.

As shown in FIGS. 1, 2, 7, to adapt the constant section extruded blade elements to mountings within the conventional type blade grip, pluralities of filler plates or "doublers" as indicated at 14 may be employed. These "doublers" may be preformed to dimensionally complement the blade profile to the inner surfaces of the grip clevis portions 16—16; and the doublers 14 may be fixed to the blade and grip devices respectively by any suitable means such as metal cement, welding, soldering, brazing, or the like. Thus it will be appreciated that the entire rotor blade assembly, including the hub grip portion thereof, may be readily fabricated and assembled at great savings in cost; and that the blade construction of the invention is of the utmost solidity and ruggedness. The metal employed in the blade construction will of course be selected to provide the desired degree of elasticity, toughness, and strength; and it will of course be appreciated that there are available today many aluminum or other alloys which readily lend themselves to the extrusion process from which blades of the present invention may be manufactured.

Thus, by virtue of the present invention a relatively inexpensive rotor type blade may be constructed which is characterized by being of uniform sectional density and having a sectional thickness distribution which places the center of gravity of the cross section area near the aerodynamic center thereof. This provides chordwise balance in a solid uniform density metal rotor blade; and as explained hereinabove such a blade may be readily manufactured by means of any simple metal shaping process. The solid blade constructions so produced have been proven to be relatively vibration-free and less vulnerable to gun fire damage or the like than are the built-up type metal blades. The solid construction of the blade also permits improved laminar flow characteristics to be attained because superior surface smoothness may be obtained thereon by simple metal polishing operations. The blade section so produced will provide a high maximum lift coefficient and a fairly low profile drag, due to the improved surface effects which are obtainable when working with solid metal. Also, the blade of the hereinabove described design provides a zero pitching moment coefficient, and an aerodynamic center location at about the 25% chord station. The center of gravity of the airfoil cross section area is at about the 25% chord station; and thus it will be appreciated that all of the manufacturing and maintenance advantages referred to hereinabove are obtained in combination with good aerodynamic qualities when the blade is swung at speeds within the normal range of helicopter rotor operations.

Although only one form of the invention has been shown and described in detail hereinabove, it will be understood that various changes may be made therein without departing from the spirit of the invention or the scope of the following claims.

I claim:

1. A helicopter rotor comprising in combination, a blade grip having a base portion and a pair of clevis portions projecting therefrom, said clevis portions being spaced apart and having generally parallel opposed surfaces, a blade comprising a solid metal member of constant section spanwise of the blade and characterized by having a chordwise sectional form of shape disparate to that of said opposed surfaces of the clevis portions, the metal of said blade being of uniform density and the center of gravity of the blade cross section being proximate to the aerodynamic center of the blade, and filler means disposed between the root end of said blade and said clevis portions of said blade grip, said filler means being in the form of a plurality of stacked leaves in which the layers thereof are of varying number chordwise of the blade to accommodate for disparity between the contour of said blade and the opposed surfaces of said clevis portions and to substantially completely fill between the blade and clevis portions.

2. A helicopter rotor blade comprising a solid metal member having an ellipsoidal shaped leading edge portion and a substantially flat thin tapering trailing edge portion faired into said leading edge portion, said trailing edge portion being of a chordwise length substantially twice that of the major dimension of said leading edge portion and being disposed relative to said leading edge portion so that the center of gravity of the blade cross section is proximate to the aerodynamic center of the blade.

3. A helicopter rotor blade comprising a solid metal extrusion having an ellipsoidal-shaped leading edge portion and a thin tapering trailing edge portion faired into said leading edge portion, said leading edge portion being formed with its major axis dimension substantially three times as great as its minor axis dimension so as to locate the center of gravity of the blade at about the ¼ chord line, and said trailing edge portion of the blade being disposed relative to the leading edge portion so that the aerodynamic center of the blade is proximate to the center of gravity of the blade.

4. A helicopter rotor blade comprising a solid metal extrusion characterized by having a sectional form including a leading edge portion sectionally shaped in the form of a 3:1 ellipse subtended by a thin tapering trailing edge portion faired into said leading edge portion, said trailing edge portion of the blade being of a chordwise length substantially twice the chordwise length of said leading edge portion, whereby the center of gravity of the blade cross section is proximate to the aerodynamic center of the blade.

5. A helicopter rotor blade comprising a solid metal extrusion of constant section spanwise of the blade and characterized by having a sectional form including an ellipsoidal shaped leading edge portion occupying one-third of the chord and subtended by a thin tapering trailing edge portion faired into said leading edge portion and existing substantially as an extension along the major axis of said ellipsoidal portion, said trailing edge portion of the blade being of a chordwise length substantially twice the chordwise length of said leading edge portion, whereby the center of gravity of the blade cross section is proximate to the aerodynamic center of the blade.

References Cited in the file of this patent

UNITED STATES PATENTS

| | | |
|---|---|---|
| 1,470,017 | Lougheed | Oct. 9, 1923 |
| 2,044,294 | Handler | June 16, 1936 |
| 2,682,925 | Wosika | July 6, 1954 |
| 2,712,356 | Jovanovich | July 5, 1955 |
| 2,754,918 | Gluhareff | July 17, 1956 |
| 2,938,585 | Fanti | May 31, 1960 |

FOREIGN PATENTS

| | | |
|---|---|---|
| 221,791 | Great Britain | Aug. 30, 1924 |
| 563,614 | Canada | Sept. 23, 1958 |
| 643,308 | France | May 15, 1928 |